3,129,143
PROCESS FOR THE PRODUCTION OF
11β-HYDROXYTESTOLOLACTONE
Josef Fried, Princeton, and Richard William Thoma, Somerville, N.J., assignors to Olin Mathieson Chemical Corporation, New York, N.Y., a corporation of Virginia
No Drawing. Original application Nov. 9, 1961, Ser. No. 151,146. Divided and this application Jan. 23, 1963, Ser. No. 258,365
1 Claim. (Cl. 195—51)

This invention relates to a method of producing 11β-hydroxytestololactone which is useful as a protein-anabolic agent when administered orally, i.e., it is useful in the treatment of underweight patients to effect the rapid build-up of protein stores.

This application is a division of a prior application, Serial No. 151,146, filed November 9, 1961.

It has been found that 11β-hydroxyandrostenedione can be converted to 11β-hydroxytestololactone by subjecting the starting material to the action of enzymes of *Cylindrocarpon radicicola*. The action of the enzymes can be utilized either by bringing together, in an aqueous nutrient medium, the steroid, oxygen and enzymes of non-proliferating cells of *Cylindrocarpon radicicola*, or (preferably) by including the steroid in an aerated culture of the microorganism.

In general, the conditions of culturing *Cylindrocarpon radicicola* for the purposes of this invention are (except for the inclusion of the steroid to be oxidized) the same as those of culturing fungi for the production of antibiotics or organic acids; thus, *Cylindrocarpon radicicola* is grown in contact with (in or on) a suitable nutrient medium in the presence of oxygen (air). A suitable nutrient medium essentially comprises a source of nitrogenous factors and an assimilable source of carbon and energy. The latter may be a carbohydrate (such as sucrose, molasses, glucose, maltose, starch or dextrin) and/or the steroid itself. Preferably, however, the medium includes an assimilable source of carbon and energy in addition to the steroid.

The source of nitrogenous factors may be organic (e.g., soybean meal, corn steep liquor, meat extract, distiller solubles, peptones and/or yeast extract) or synthetic (i.e., composed of simple, synthesizable organic and inorganic compounds such as ammonium salts, alkali nitrates, amino acids or urea).

The product is isolated from the fermentation broth and crystallized by conventional procedures.

The following example is illustrative of the invention (all temperatures being expressed in degrees centigrade):

EXAMPLE 1

*11β-Hydroxytestololactone*

(a) FERMENTATION

Surface growth from a 10 to 24 day old agar slant (prepared from dextrose, 40 g.; neopeptone, 10 g.; agar, 15 g.; and distilled water to make one liter) culture of *Cylindrocarpon radicicola*, A.T.C.C. No. 11011 (obtainable from the American Type Culture Collection, Washington, D.C.), is washed off with 10 ml. of aqueous 0.01% Duponol (a wetting agent). One ml. aliquots of the suspension are transferred to six 250 ml. conical flasks, each containing 50 ml. of the following medium (A):

| | G. |
|---|---|
| Dextrose | 10 |
| Corn steep liquor | 6 |
| $NH_4H_2PO_4$ | 3 |
| $CaCO_3$ | 2.5 |
| Yeast extract | 2.5 |
| Soybean oil | 2.2 |
| Distilled water to one liter. | |

Adjusted to pH 7.0 and sterilized for 30 min. at 120°. The flasks so inoculated are incubated at 25° with rotary mechanical shaking in a circle of radius 2 inches at 280 r.p.m. After 45 hours, a 10% (vol./vol.) transfer is made to 38 flasks of fresh medium A. Incubation of the second flask stage is as with the first. 475 mg. of 11β-hydroxyandrostenedione is added in 19 ml. of methanolic solution (0.5 ml. per flask). One hundred and nineteen hours after the addition of the steroid, the contents of the flasks are pooled, filtered and flasks and pad are washed with water. The total volume of filtrate and washings is 2000 ml.

(b) ISOLATION OF 11β-HYDROXYTESTOLOLACTONE

The culture filtrate and washings are extracted with three 700 ml. portions of chloroform, the combined extracts filtered, and the filtrate evaporated to dryness in vacuo. The residue (225 mg.), which crystallizes spontaneously after several days, is recrystallized from acetone-hexane. 125 mg. of 11β-hydroxytestololactone is obtained which has the following properties: M.P. 168–170°; $[\alpha]_D^{23}$ +111° (c., 0.53 in $CHCl_3$);

$\lambda_{max}^{alc.}$ 242 $m\mu$ ($\epsilon = 15{,}000$); $\lambda_{max}^{Nujol}$ 3.00, 5.78, 6.03 and 5.22$\mu$

*Analysis.*—Calcd. for $C_{19}H_{24}O_4$ (316.38): C, 72.12; H, 7.65. Found: C, 72.38; H, 7.76.

The invention may be otherwise variously embodied within the scope of the appended claim.

What is claimed is:

A process for preparing 11β-hydroxytestololactone which comprises subjecting 11β-hydroxyandrostenedione to the actions of enzymes of *Cylindrocarpon radicicola* in the presence of oxygen and recovering the resulting 11β-hydroxytestololactone.

References Cited in the file of this patent

UNITED STATES PATENTS

| 2,981,659 | Fonken et al. | Apr. 25, 1961 |
| 3,047,469 | Sih et al. | July 31, 1962 |